United States Patent
Vetters et al.

(10) Patent No.: US 10,316,682 B2
(45) Date of Patent: Jun. 11, 2019

(54) COMPOSITE KEYSTONED BLADE TRACK

(71) Applicants: Rolls-Royce North American Technologies, Inc., Indianapolis, IN (US); Rolls-Royce plc, London (GB)

(72) Inventors: Daniel K. Vetters, Indianapolis, IN (US); Paul A. Davis, Bristol (GB); Simon L. Jones, Bristol (GB); Steven Hillier, Manchester (GB); Peter Broadhead, Derby (GB)

(73) Assignees: Rolls-Royce North American Technologies Inc., Indianapolis, IN (US); Rolls-Royce plc (GB)

( * ) Notice: Subject to any disclaimer, the term of this patent is extended or adjusted under 35 U.S.C. 154(b) by 720 days.

(21) Appl. No.: 15/088,852

(22) Filed: Apr. 1, 2016

(65) Prior Publication Data

US 2016/0333718 A1 Nov. 17, 2016

Related U.S. Application Data

(60) Provisional application No. 62/154,400, filed on Apr. 29, 2015, provisional application No. 62/154,461, filed on Apr. 29, 2015.

(51) Int. Cl.
*F01D 11/12* (2006.01)
*C04B 35/83* (2006.01)
(Continued)

(52) U.S. Cl.
CPC .......... *F01D 11/122* (2013.01); *C04B 35/803* (2013.01); *C04B 35/806* (2013.01);
(Continued)

(58) Field of Classification Search
CPC ...... F01D 11/122; F01D 11/12; F01D 25/005; F01D 25/12; C04B 35/00; F04D 29/164; F04D 29/526; Y02T 50/672; F05D 2220/32; F05D 2230/60; F05D 2240/11; F05D 2240/55; F05D 2260/22141; F05D 2260/52; F05D 2300/6033
See application file for complete search history.

(56) References Cited

U.S. PATENT DOCUMENTS 3,601,414 A  8/1971 Rao
4,087,199 A  5/1978 Hemsworth et al.
(Continued)

FOREIGN PATENT DOCUMENTS

DE  102008044450 A1  2/2009
EP     1965030 A2   9/2008
(Continued)

OTHER PUBLICATIONS

Corman, Gregory S. and Luthra, Krishnan L.; Melt Infiltrated Ceramic Composites (HIPERCOMP®) for Gas Turbine Engine Applications; DOE/CE/41000-3; May 1994-Sep. 2005; pp. 1-507.
(Continued)

*Primary Examiner* — Carlos A Rivera
*Assistant Examiner* — Eric J Zamora Alvarez
(74) *Attorney, Agent, or Firm* — Barnes & Thornburg LLP

(57) ABSTRACT

A blade track for a gas turbine engine includes a plurality of blade track segments. The blade track segments are arranged circumferentially around a central axis to form the blade track.

20 Claims, 5 Drawing Sheets

(51) Int. Cl.
*C04B 35/80* (2006.01)
*F04D 29/16* (2006.01)
*F01D 25/00* (2006.01)
*F01D 25/12* (2006.01)
*F04D 29/52* (2006.01)

(52) U.S. Cl.
CPC .............. *C04B 35/83* (2013.01); *F01D 11/12* (2013.01); *F01D 25/005* (2013.01); *F01D 25/12* (2013.01); *F04D 29/164* (2013.01); *F04D 29/526* (2013.01); *C04B 2235/5252* (2013.01); *C04B 2235/94* (2013.01); *F05D 2220/32* (2013.01); *F05D 2230/60* (2013.01); *F05D 2240/11* (2013.01); *F05D 2240/55* (2013.01); *F05D 2260/22141* (2013.01); *F05D 2260/52* (2013.01); *F05D 2300/6033* (2013.01); *Y02T 50/672* (2013.01)

(56) References Cited

U.S. PATENT DOCUMENTS

| | | | |
|---|---|---|---|
| 4,477,086 A | 10/1984 | Feder et al. | |
| 4,646,810 A | 3/1987 | Lardellier | |
| 4,679,981 A | 7/1987 | Guibert et al. | |
| 4,863,345 A | 9/1989 | Thompson et al. | |
| 5,163,809 A | 11/1992 | Akgun et al. | |
| 5,431,532 A * | 7/1995 | Humke | F01D 21/045 415/9 |
| 5,738,490 A | 4/1998 | Pizzi | |
| 6,113,349 A * | 9/2000 | Bagepalli | F01D 11/08 415/135 |
| 6,142,731 A | 11/2000 | Dewis et al. | |
| 6,315,519 B1 | 11/2001 | Bagepalli et al. | |
| 6,517,313 B2 | 2/2003 | Rogers | |
| 6,726,448 B2 | 4/2004 | McGrath et al. | |
| 6,733,233 B2 | 5/2004 | Jasklowski et al. | |
| 6,758,386 B2 | 7/2004 | Marshall et al. | |
| 6,758,653 B2 | 7/2004 | Morrison | |
| 6,896,483 B2 | 5/2005 | Dierksmeier et al. | |
| 6,910,853 B2 | 6/2005 | Corman et al. | |
| 7,090,459 B2 | 8/2006 | Bhate et al. | |
| 7,195,452 B2 | 3/2007 | Allan et al. | |
| 7,217,089 B2 | 5/2007 | Durocher et al. | |
| 7,234,306 B2 | 6/2007 | Aumont et al. | |
| 7,374,396 B2 | 5/2008 | Martin et al. | |
| 7,435,049 B2 | 10/2008 | Ghasripoor et al. | |
| 7,641,442 B2 | 1/2010 | Denece et al. | |
| 7,665,960 B2 | 2/2010 | Shi et al. | |
| 7,686,577 B2 * | 3/2010 | Morrison | F01D 9/04 415/139 |
| 7,771,160 B2 | 8/2010 | Shi et al. | |
| 7,914,256 B2 | 3/2011 | Xie et al. | |
| 7,988,395 B2 | 8/2011 | Steffier | |
| 3,061,977 A1 | 11/2011 | Keller et al. | |
| 8,047,773 B2 | 11/2011 | Bruce et al. | |
| 8,079,807 B2 | 12/2011 | Shapiro et al. | |
| 8,092,160 B2 | 1/2012 | Shi et al. | |
| 8,167,546 B2 | 5/2012 | Shi et al. | |
| 8,235,670 B2 | 8/2012 | Morrison et al. | |
| 8,246,299 B2 * | 8/2012 | Razzell | F01D 11/005 415/173.1 |
| 8,257,029 B2 | 9/2012 | Habarou et al. | |
| 8,322,983 B2 | 12/2012 | Marini | |
| 8,328,505 B2 | 12/2012 | Shi et al. | |
| 8,496,431 B2 | 7/2013 | Habarou et al. | |
| 8,511,975 B2 | 8/2013 | Shi et al. | |
| 8,555,647 B2 | 10/2013 | Dimascio et al. | |
| 8,568,091 B2 | 10/2013 | McCaffrey | |
| 8,651,497 B2 | 2/2014 | Tholen et al. | |
| 8,684,689 B2 | 4/2014 | Guo et al. | |
| 8,739,547 B2 | 6/2014 | Jarmon et al. | |
| 8,740,552 B2 | 6/2014 | Marusko et al. | |
| 8,770,931 B2 | 7/2014 | Alvanos et al. | |
| 8,784,052 B2 | 7/2014 | Shi et al. | |
| 8,790,067 B2 | 7/2014 | McCaffrey et al. | |
| 8,801,372 B2 | 8/2014 | Shi et al. | |
| 8,814,173 B2 | 8/2014 | Motzkus et al. | |
| 8,834,106 B2 | 9/2014 | Luczak | |
| 8,905,709 B2 * | 12/2014 | Dziech | F01D 11/005 415/173.1 |
| 8,926,270 B2 | 1/2015 | Karafillis et al. | |
| 9,011,079 B2 | 4/2015 | Coign et al. | |
| 2004/0047726 A1 | 3/2004 | Morrison | |
| 2009/0208322 A1 | 8/2009 | McCaffrey | |
| 2010/0111678 A1 | 5/2010 | Habarou et al. | |
| 2010/0150703 A1 | 6/2010 | Gonzalez et al. | |
| 2010/0232941 A1 | 9/2010 | Smoke et al. | |
| 2011/0052384 A1 | 3/2011 | Shi et al. | |
| 2011/0057394 A1 | 3/2011 | Hailing | |
| 2011/0150635 A1 | 6/2011 | Motzkus et al. | |
| 2011/0274538 A1 | 11/2011 | Shi et al. | |
| 2012/0070276 A1 | 3/2012 | Shi et al. | |
| 2012/0082540 A1 * | 4/2012 | Dziech | F01D 11/005 415/173.1 |
| 2012/0107107 A1 | 5/2012 | Chan et al. | |
| 2012/0156029 A1 | 6/2012 | Karafillis et al. | |
| 2012/0177488 A1 | 7/2012 | Corman | |
| 2012/0247124 A1 | 10/2012 | Shapiro et al. | |
| 2012/0263582 A1 | 10/2012 | Foster et al. | |
| 2012/0301269 A1 | 11/2012 | Alvanos et al. | |
| 2012/0301312 A1 | 11/2012 | Berczik et al. | |
| 2012/0301303 A1 | 12/2012 | Alvanos et al. | |
| 2012/0308367 A1 | 12/2012 | Luczak | |
| 2013/0008176 A1 | 1/2013 | Shi et al. | |
| 2013/0011248 A1 | 1/2013 | Croteau et al. | |
| 2013/0136582 A1 * | 5/2013 | Mizokami | F01D 9/04 415/173.1 |
| 2013/0177384 A1 | 7/2013 | Coign et al. | |
| 2013/0177411 A1 | 7/2013 | Weber et al. | |
| 2014/0202168 A1 | 7/2014 | Shapiro et al. | |
| 2014/0260320 A1 | 9/2014 | Graves et al. | |
| 2014/0271144 A1 | 9/2014 | Landwehr et al. | |
| 2014/0271145 A1 * | 9/2014 | Thomas | F01D 11/08 415/173.1 |
| 2015/0044044 A1 | 2/2015 | Sippel et al. | |
| 2015/0044049 A1 * | 2/2015 | Lamusga | F01D 11/08 416/182 |
| 2015/0226084 A1 * | 8/2015 | Beaujard | F01D 5/282 415/200 |
| 2016/0123171 A1 | 5/2016 | Westphal et al. | |
| 2016/0177786 A1 | 6/2016 | Sippel et al. | |
| 2016/0208635 A1 | 7/2016 | Vetters et al. | |
| 2016/0222812 A1 | 8/2016 | Sippel et al. | |

FOREIGN PATENT DOCUMENTS

| | | | |
|---|---|---|---|
| EP | 2589774 | A1 | 5/2013 |
| EP | 2604805 | A2 | 6/2013 |
| FR | 2580033 | A1 | 10/1986 |
| FR | 2980235 | B1 | 4/2015 |
| GB | 2235730 | A | 3/1991 |
| GB | 2468768 | A | 9/2010 |
| GB | 2480766 | A | 11/2011 |
| JP | 09250304 | A | 9/1997 |
| JP | 09264104 | A | 10/1997 |
| WO | 2010058137 | A1 | 5/2010 |
| WO | 2011157956 | A1 | 12/2011 |
| WO | 2014120334 | A1 | 8/2014 |
| WO | 2014143225 | A1 | 9/2014 |
| WO | 2014163674 | A1 | 10/2014 |

OTHER PUBLICATIONS

Extended European Search Report, European Application No. 16164265.7-1610, dated Sep. 30, 2016, 7 pages.
Extended European Search Report, European Application No. 16165824.0-1610, dated Sep. 30, 2016, 7 pages.
Blosser, Max L.; Thermal Stress in High Temperature Cylindrical Fasteners; NASA Technical Memorandum; May 1988; pp. 1-12.

(56) References Cited

OTHER PUBLICATIONS

Blosser, Max L.and McWithey, Robert R.; Theoretical Basis for Design of Thermal-Stress-Free Fasteners; NASA Technical Paper; Dec. 1983; pp. 1-26.

\* cited by examiner

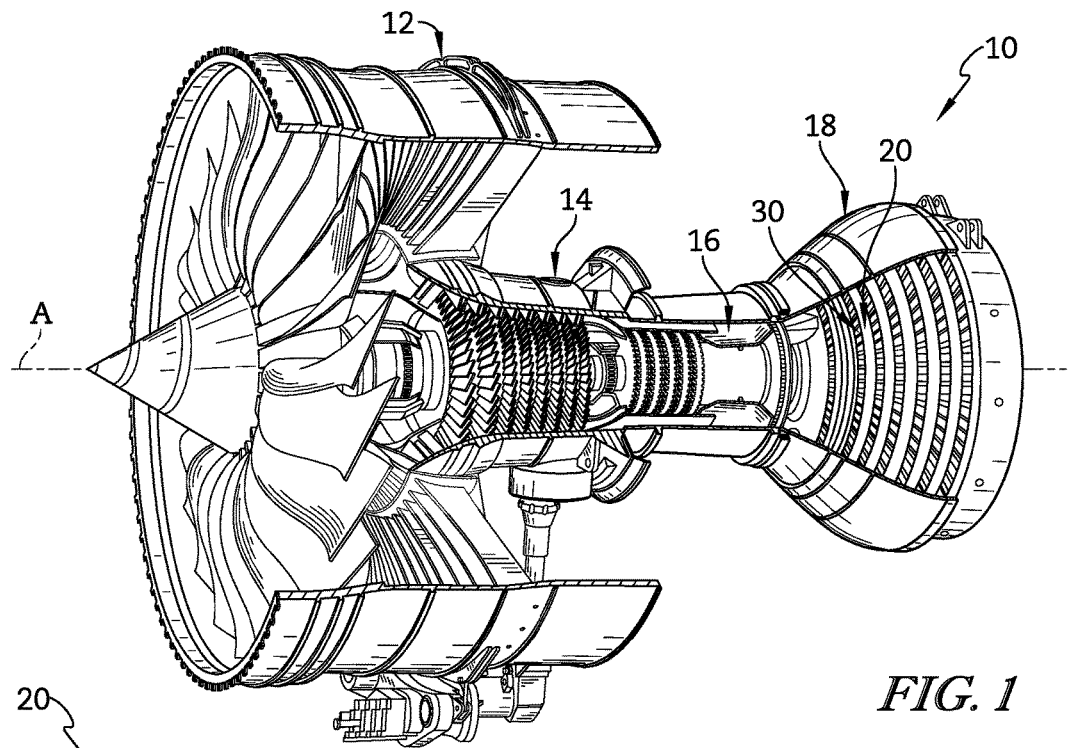
FIG. 1
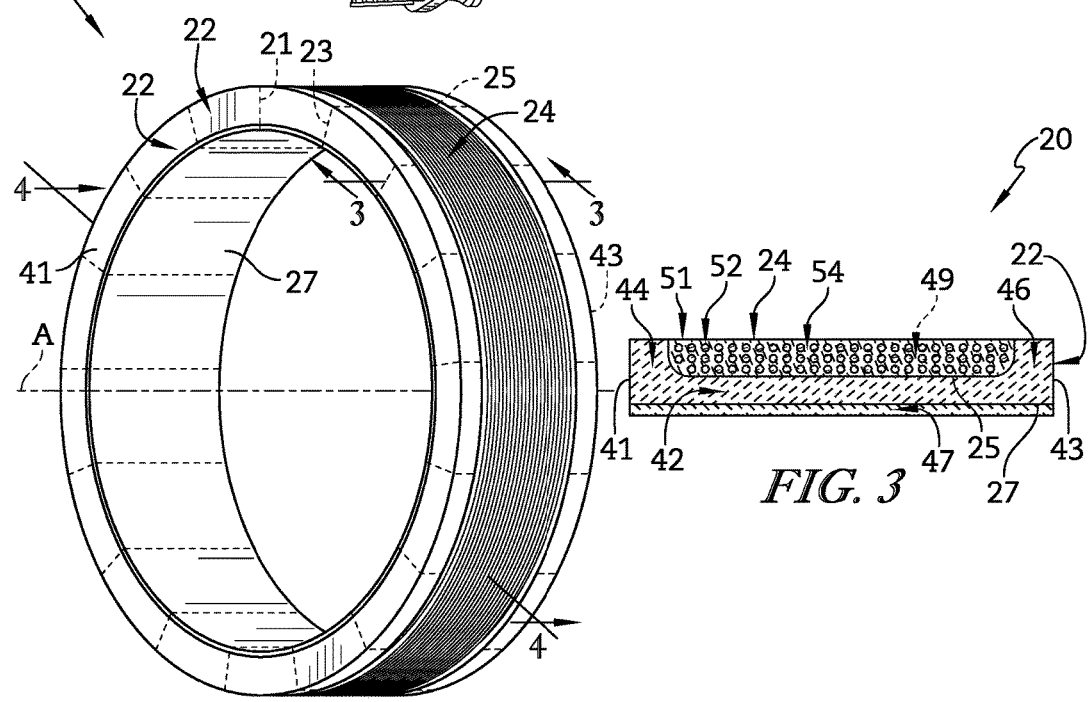
FIG. 2
FIG. 3

COMPOSITE KEYSTONED BLADE TRACK

CROSS REFERENCE TO RELATED APPLICATIONS

This application claims priority to and the benefit of U.S. Provisional Patent Application No. 62/154,400, filed 29 Apr. 2015 and U.S. Provisional Patent Application No. 62/154,461, filed 29 Apr. 2015, the disclosures of which are now expressly incorporated herein by reference.

FIELD OF THE DISCLOSURE

The present disclosure relates generally to gas turbine engines, and more specifically to ceramic-containing composite blade tracks used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies that perform work on or extract work from gasses moving through a primary gas path of the engine. The rotating wheel assemblies include disks carrying blades around their outer edges. When the rotating wheel assemblies turn, tips of the blades move along blade tracks that are arranged around the rotating wheel assemblies. Such blade tracks are adapted to reduce the leakage of gas over the blades without interaction with the blades. The blade tracks may also be designed to minimize leakage of gas into or out of the primary gas path.

SUMMARY

The present disclosure may comprise one or more of the following features and combinations thereof.

According to the present disclosure, a blade track for a gas turbine engine may include a plurality of blade track segments and a composite-lock structure. The blade track segments may comprise ceramic-matrix composite materials and may be shaped to extend part-way around a central axis. Each blade track segment may include opposing circumferential end faces and a radially outer surface extending between the end faces. The composite-lock structure may be positioned to engage the outer surfaces of the blade track segments. The composite-lock structure may include at least one reinforcement fiber of ceramic-containing material suspended in ceramic-matrix material.

In illustrative embodiments, the blade track segments may be positioned circumferentially around the central axis to form a ring. The end faces of the blade track segments may be engaged with one another. The composite-lock structure may be configured to provide a radially-inward force toward the central axis against the blade track segments such that each blade track segment acts as a keystone to maintain the form of the ring.

In illustrative embodiments, the at least one reinforcement fiber may be positioned to circumferentially surround the ring along the outer surfaces of the blade track segments.

In illustrative embodiments, the at least one reinforcement fiber may be a single continuous fiber that extends around the ring at least twice.

In illustrative embodiments, the at least one reinforcement fiber may include a plurality of fibers.

In illustrative embodiments, each of the blade track segments may further include a runner and a pair of flanges that extend radially outward from the outer surface of the runner to form a radially-outward opening lock-receiving channel with the runner that receives at least a portion of the composite-lock structure.

In illustrative embodiments, a first one of the pair of flanges may extend outwardly in the radial direction along an axially-forward face of the runner to form a generally continuous axially-forward face of the blade track segment.

In illustrative embodiments, a second one of the pair of flanges may extend outwardly in the radial direction along an axially-aft face of the runner to form a generally continuous axially-aft face of the blade track segment.

In illustrative embodiments, the end faces of the blade track segments may be configured to engage and form a resultant radially-outward force away from the central axis against the composite-lock structure.

In illustrative embodiments, the end faces may extend radially inward from the outer surface and may be positioned to lie in a plane defined in part by the central axis.

According to the present disclosure, a method of assembling a blade track for use in a gas turbine engine may include positioning a plurality of blade track segments circumferentially around a central axis, each blade track segment including opposing circumferential end faces and a radially outer surface extending between the end faces, engaging the end faces of adjacent blade track segments together to form a ring of blade track segments, and forming a composite-lock structure along the outer surfaces of the blade track segments. Each blade track segment may comprise ceramic-matrix composite materials and may be shaped to extend part-way around the central axis. The composite-lock structure may comprise ceramic-matrix composite materials. The composite-lock structure may be configured to provide a radially inward force against the blade track segments such that each blade track segment acts as a keystone to maintain the form of the ring.

In illustrative embodiments, forming the composite-lock structure may include positioning at least one reinforcement fiber of ceramic-containing material along the outer surfaces of the blade track segments and suspending the at least one reinforcement fiber in ceramic-matrix material.

In illustrative embodiments, suspending the at least one reinforcement fiber in ceramic-matrix material may include infiltrating the at least one reinforcement fiber with the ceramic-matrix material and solidifying the ceramic-matrix material to form a ceramic-matrix composite structure.

In illustrative embodiments, the at least one reinforcement fiber may be infiltrated using at least one of a slurry infiltration process or melt infiltration process.

In illustrative embodiments, the at least one reinforcement fiber may be a single continuous fiber.

In illustrative embodiments, the method may further include wrapping the fiber around the ring along the outer surfaces of the blade tracks at least once.

In illustrative embodiments, the method may further include wrapping the fiber around the ring along the outer surfaces of the blade tracks at least twice.

According to the present disclosure, a method of forming a blade track for use in a gas turbine engine may include forming a plurality of blade track segments from ceramic-matrix composite materials, arranging the blade track segments in a ring, and forming a composite-lock structure from ceramic-matrix composite materials along radially outer surfaces of the blade track segments. The composite-lock structure may be configured to provide a radially inward force against the blade track segments such that each blade track segment acts as a keystone to maintain the form of the ring.

In illustrative embodiments, forming the composite-lock structure may include wrapping a single continuous fiber of ceramic-containing material along the outer surfaces of the blade track segments at least once and suspending the at least reinforcement one fiber in ceramic-matrix material.

In illustrative embodiments, suspending the at least one reinforcement fiber in ceramic-matrix material may include infiltrating the at least one reinforcement fiber with the ceramic-matrix material and solidifying the ceramic-matrix material to form a ceramic-matrix composite structure.

In illustrative embodiments, the method may further include wrapping the fiber around the ring along the outer surfaces of the blade tracks at least twice.

These and other features of the present disclosure will become more apparent from the following description of the illustrative embodiments.

BRIEF DESCRIPTION OF THE DRAWINGS

FIG. 1 is a perspective view of a gas turbine engine cut away to show that the engine includes a fan, a compressor, a combustor, and a turbine;

FIG. 2 is a perspective view of a blade track adapted for use in the turbine of the gas turbine engine of FIG. 1 to block hot gasses from passing over blades of a turbine wheel showing that the blade track includes a plurality of blade track segments arranged circumferentially adjacent to one another and a fiber wrap extending around the segments to provide a composite-lock structure that holds the blade track segments in a ring;

FIG. 3 is a sectional view of the blade track of FIG. 2 taken along line 3-3 showing that the blade track segments each include a runner and a pair of fiber-retention flanges extending radially outward from the runner and showing that the fiber wrap is positioned between the flanges of the blade track;

DETAILED DESCRIPTION OF THE DRAWINGS

Figure 4:
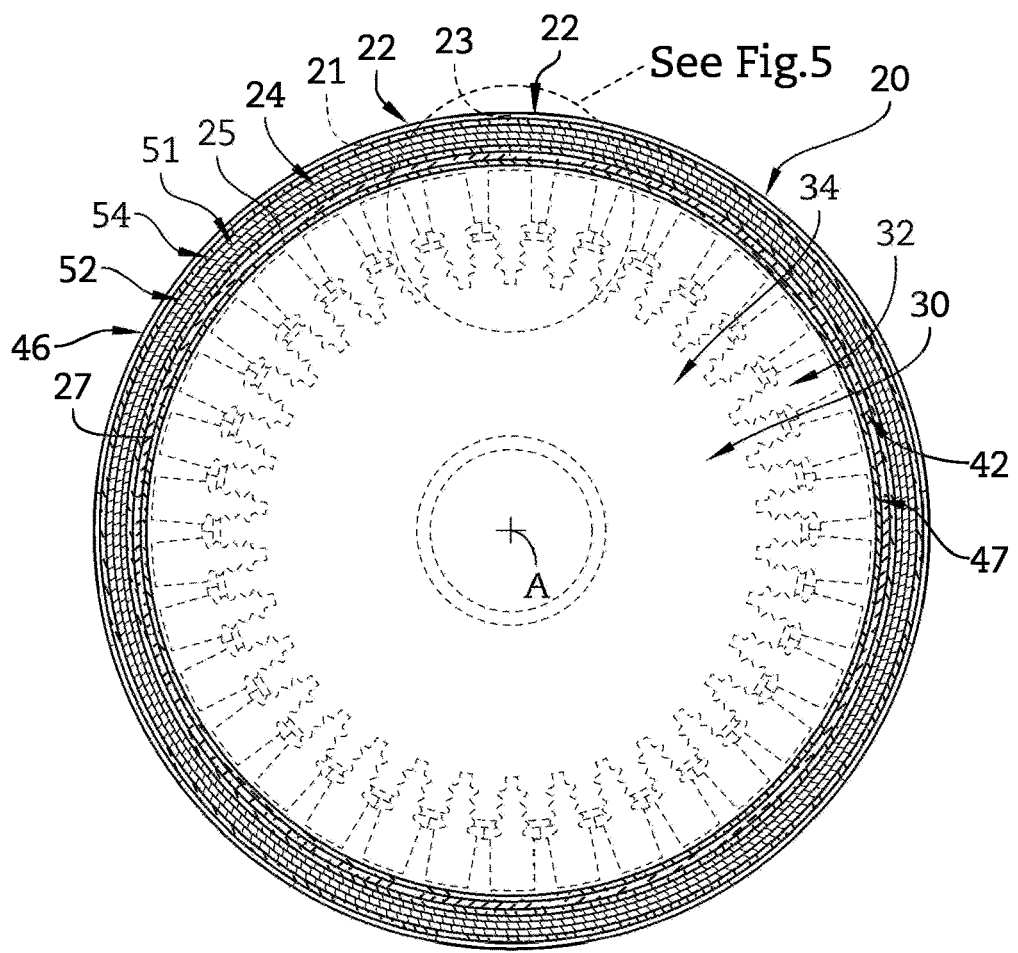
FIG. 4 is a sectional view of the blade track of FIG. 2 taken along line 4-4 showing the blade track surrounding blades of a turbine wheel and suggesting that the fiber wrap is formed from a continuous fiber of ceramic-containing material wrapped around the ring of blade track segments.

For the purposes of promoting an understanding of the principles of the disclosure, reference will now be made to a number of illustrative embodiments illustrated in the drawings and specific language will be used to describe the same.

FIG. 1 shows an illustrative aerospace gas turbine engine 10 cut-away to show that the engine 10 includes a fan 12, a compressor 14, a combustor 16, and a turbine 18. The fan 12 pushes air through the engine 10 to propel an aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 and the turbine 18 extracts work to drive the compressor 14 and the fan 12.

The turbine 18 illustratively includes at least one turbine wheel assembly 30 and a blade track 20 positioned to surround the turbine wheel assembly 30 as shown in FIGS. 1 and 4. The turbine wheel assembly 30 includes a plurality of blades 32 coupled to a rotor disk 34 for rotation therewith. The hot, high pressure combustion products from the combustor 16 are directed toward the blades 32 of the turbine wheel assemblies 30. The blades 32 are in turn pushed by the combustion products to cause the turbine wheel assembly 30 to rotate; thereby, driving the rotating components of the compressor 14 and/or the fan 12.

The blade track 20 extends around the turbine wheel assembly 30 to block combustion products from passing over the blades 32 without pushing the blades 32 to rotate as suggested in FIG. 4. The blade track 20 includes a plurality of blade track segments 22 that cooperate to form a ring and a composite-lock structure 24 integrated with the blade track segments 22 as shown in FIG. 2. The blade track segments 22 are each shaped to extend part-way around a central axis A and comprise ceramic-matrix composite materials. The composite-lock structure 24 illustratively includes a matrix-infiltrated fiber wrap 51 that extends around the blade track segments 22 and that is integrated with the blade track segments 22 to form a full hoop blade track 20.

Each of the blade track segments 22 includes opposing circumferential end faces 21, 23 and a radially outer surface 25 extending between the end faces 21, 23 as shown in FIG. 2. The blade track segments 22 are positioned circumferentially around the central axis A to form a substantially continuous ring and the composite-lock structure 24 is positioned to engage the outer surfaces 25 of the blade track segments 22 to maintain the shape of the blade track 20. Each blade track segment 22 is illustratively made from silicon-carbide, silicon-carbide ceramic-matrix composite, but may be made from oxide, oxide ceramic-matrix composite or the like.

In the illustrative embodiment, the end faces 21, 23 extend radially inward from the outer surface 25 and are positioned to lie in a plane defined in part by the central axis A as suggested in FIG. 2. The composite-lock structure 24 is configured to provide a radially-inward force toward the central axis A against the blade track segments 22. The end faces 21, 23 of adjacent blade track segments 22 engage with one another to provide an opposing radially-outward force away from the central axis A and against the composite-lock structure 24. As such, each blade track segment 22 acts as a keystone for circumferentially-adjacent blade track segments 22 to maintain the form of the blade track 20. The composite-lock structure 24 maintains alignment of the blade track segments 22 in the ring.

Radially-inward loads placed on the blade track 20 are distributed through the blade track segments 22 as compressive hoop load as suggested in FIG. 2. Radially-outward loads placed on the blade track 20 are distributed through the composite-lock structure 24 as tensile hoop load. In some embodiments, engagement between the end faces 21, 23 forms a seal between adjacent blade track segments 22. In some embodiments, the blade track segments 22 are integrally joined through co-processing, welding, or brazing, for example, to form a seal between adjacent blade track segments 22.

Each of the blade track segments 22 includes a runner 42 along which blades 32 of the turbine wheel assembly 30 move and a pair of flanges 44, 46 that extend from the runner 42 as shown in FIG. 3. An abradable layer 47 may be applied to a radially-inward face 27 of the runner 42. The flanges 44, 46 illustratively extend radially outward from an outer surface 25 of the runner 42 as shown in FIG. 3. The forward flange 44 defines an axially-forward face 41 of the blade track segment 22 and the aft flange 46 defines an axially-aft face 43 of the blade track segment 22. The flanges 44, 46 are spaced apart from one another and define a radially-outward opening, lock-receiving channel 49 with the runner 42. The lock-receiving channel 49 receives at least a portion of the composite-lock structure 24. In some embodiments, the blade track segments 22 may have an environmental barrier coating (EBC) or abradable coating applied to the radially-inward face 27 prior to or after assembly of the blade track 20.

The flanges 44, 46 are illustratively shown extending circumferentially along forward and aft edges of the blade track segments 22 in FIGS. 2 and 3. However, the flanges 44, 46 may be axially spaced from the forward and aft edges of the blade track segments 22 with portions of the outer surface 25 positioned between the flanges 44, 46 and the forward and aft edges. In some embodiments, seal members may be positioned on the portions of the outer surface 25 between the flanges 44, 46 and the forward and aft edges.

Figure 5:
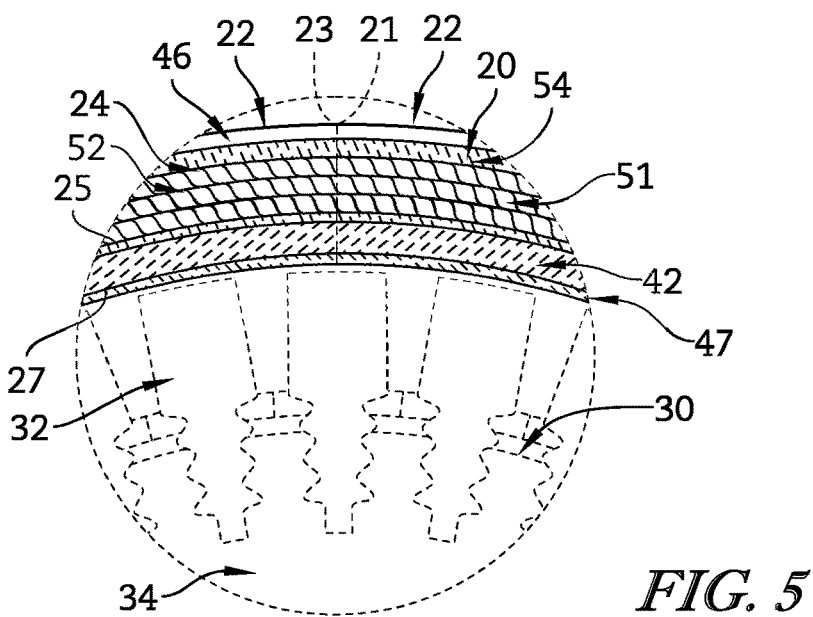
FIG. 5 is a detail view of the blade track of FIG. 4 showing that adjacent blade track segments engage with one another to keystone against one another and suggesting that the composite-lock structure provides a radially inward force that holds the blade track segments together.
Figure 6:
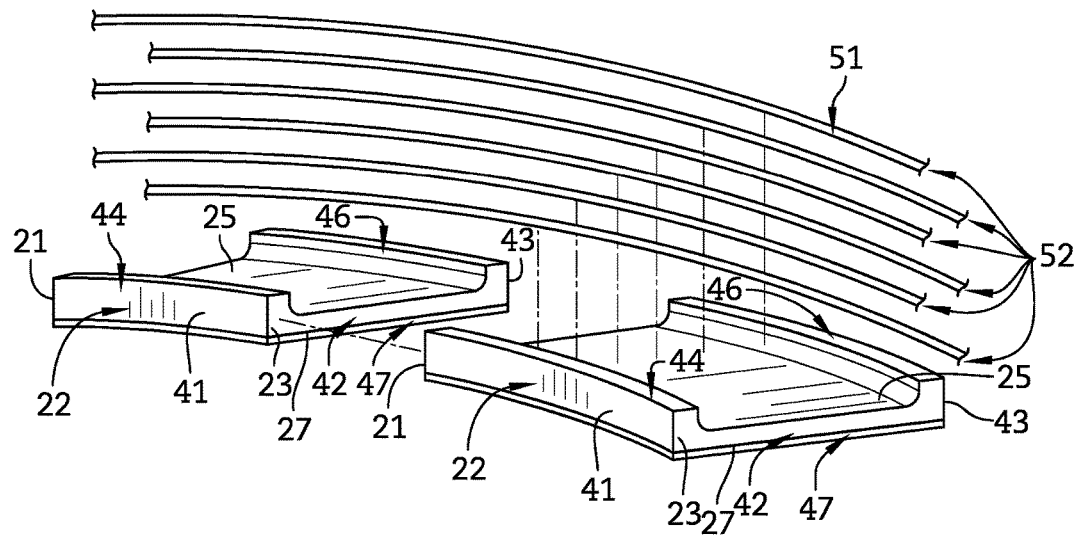
FIG. 6 is an exploded assembly view of a portion of the blade track suggesting that the blade track segments are arranged end-to-end and that the fiber wrap engages with a radially outer surface of the runner.

In the illustrative embodiment, the composite-lock structure 24 includes one or more reinforcement fibers 52 positioned within a lock body 54 as shown in FIGS. 3-5. The reinforcement fibers 52 comprise ceramic-containing materials and the lock body 54 comprises ceramic-matrix materials. In the illustrative embodiments, the reinforcement fibers 52 and the lock body 54 form a silicon-carbide, silicon-carbide ceramic-matrix composite, but may form an oxide, oxide ceramic-matrix composite or the like. In some embodiments, the reinforcement fibers 52 comprise a single, continuous fiber 52 that is wrapped along the outer surfaces 25 of the blade track segments 22, as suggested in FIG. 6, and around the ring of blade track segments 22 at least once, as suggested in FIG. 4. In other embodiments, the reinforcement fibers 52 are arranged in a fiber mat that may have a width substantially matching a width of the lock-receiving channel 49. In some embodiments, the fiber mat has a length allowing the fiber mat to be wrapped along the outer surfaces 25 of the blade track segments 22 and around the ring of blade track segments 22 at least once. Other arrangements for the reinforcement fibers 52 are possible.

The present disclosure contemplates taking advantage of the high temperature capability of ceramic-matrix composites (CMC) to improve specific fuel consumption (SFC) with a full hoop CMC blade track. By eliminating the gaps between the blade track segments 22, the cooling and leakage air flow rates needed to cool the blade track 20 are significantly reduced, thereby improving SFC. The elimination of gaps between blade track segments 22 also improves blade efficiency by reducing leakage from the gas path and minimizing negative effects on aerodynamics of the blades, leading to additional improvements in SFC.

Large full hoop blade tracks can be difficult to manufacture. First of all, it may require large processing equipment and in some cases this can require a different process as well. This may end up being costly because of the investment in larger equipment as well as development of a different process required by the new, larger processing equipment. Secondly, creating large diameter, thin walled parts may be difficult to do without distortion and out of roundness.

The present disclosure contemplates overcoming these difficulties by building a full hoop CMC blade track out of multiple segments, keystoned together, and held in place via a supporting hoop on their outer surface. Contact between the segments as they are forced together into a solid ring would provide a seal between the gas path and the cavity outboard of the ring of CMC segments. Integrally joining the ring of segments via co-processing, brazing, welding, etc. may further ensure sealing between segments.

The full hoop may be cross-keyed in place to mount it concentric to the centerline of the engine. Non-planar features between segments that would self locate the segments radially and/or axially to one another may be incorporated into the shown design without departing from the intended scope of the disclosure. Such features may be an assembly aid as well as a means to ensure parts do not slip relative to each other during operation.

In the illustrated embodiment, the segments would have short lips (or flanges) running circumferentially along the leading edge and trailing edge. The segments would be planar at their interfaces since the assembled full hoop will be integrally joined during subsequent processing. Another function of these lips (or flanges) would be to provide stiffness to keep the ring circular during processing, assembly, and operation. These lips (or flanges) could also be used to provide sealing surfaces at the leading edge and trailing edge.

A single fiber or a mat of fiber the same width as the distance between the lips may then wound about the assembly, like a spool. This wound assembly may be subsequently processed through slurry infiltration (SI) and melt infiltration (MI). The resulting component will be an integral assembly with fully processed segments integrally bonded together and to the wrapping fibers. The fiber portion of the assembly may be partially processed, so it will not obtain optimum CMC properties. However, that may be acceptable, since it merely needs to stay in place and carry any hoop load created from outward load on the segments. Note that pressure loads during operation are expected to be inward, loading the hoop in compression. So the fiber wrap is more to aid assembly, maintain segment to segment alignment, and to carry any transient reverse, tensile, loading.

In one embodiment of an assembly process, the blade track segments 22 are each formed and CVI processed prior to being circumferentially arranged in a continuous ring. The ring of blade track segments 22 may then be wrapped with the fiber wrap 51. The fiber wrap 51 is then processed by slurry infiltration and melt infiltration. The slurry and melt infiltration processes may also process portions of the blade track segments 22. In some embodiments, the fiber or fibers in the fiber wrap 51 are coated with Boron Nitride. This fiber coating creates a boundary that provides some forgiveness for differential coefficients of thermal expansion, for different elastic moduluses, and for environmental protection, for example. In some embodiments, the blade track segments 22 are arranged into the ring prior to CVI processing and wrapped with the fiber wrap 51. The wrapped ring of blade track segments 22 would then receive CVI processing.

The blade track 20 is illustratively shown in the turbine 18 of the gas turbine engine in FIG. 1. However, the blade track 20 may be used in other portion of the engine 10, such as the compressor 14 for example. The blade track 20 may have non-planar axial or radial locating features between the blade track segments 22. Alternatively, the blade track segments 22 may be assembled together in a partially processed state, such as after chemical vapor infiltration (CVI), and receive final processing together, such as through a slurry and/or melt infiltration. As such, the blade track segments 22 would be integrally joined, not allowing relative movement during operation of the engine 10.

Figure 7:
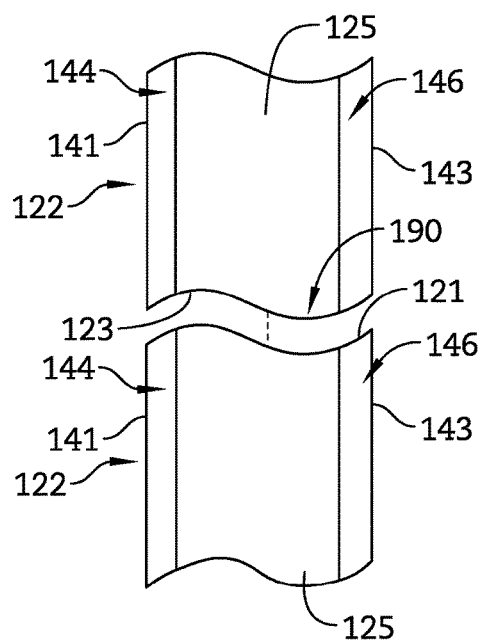
FIG. 7 is a top plan view of a pair of blade track segments including one embodiment of a non-planar locating feature formed along circumferential end faces of the blade track segments.

In one illustrative embodiment, blade track segments 122 include non-planar locating features 190 along circumferential end faces 121, 123 as shown in FIG. 7. Each blade track segment 122 includes a pair of flanges 144, 146 extending from an outer surface 125 along axially-forward and axially-aft faces 141, 143 of the blade track segments 122. The circumferential end faces 121, 123 extend between the axial faces 141, 143 and are formed to include the non-planar locating feature 190.

The non-planar locating feature 190 has a curved profile as shown in FIG. 7. The curved profile of the non-planar locating feature 190 on end face 121 is substantially a mirror image of the curved profile of the non-planar locating feature 190 on end face 123. As such, end face 121 of one blade track segment 122 can engage with end face 123 of an adjacent blade track segment 122 along a substantially entire length of the end faces 121, 123 between the axial faces 141, 143.

Figure 8:
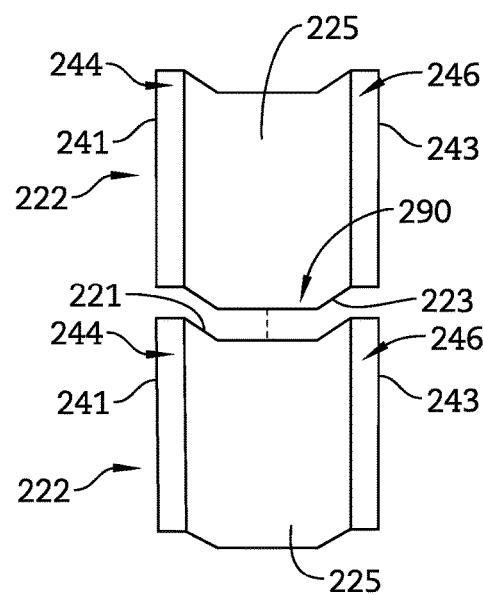
FIG. 8 is a top plan view of a pair of blade track segments including another embodiment of a non-planar locating feature formed along circumferential end faces of the blade track segments

In another illustrative embodiment, blade track segments 222 include non-planar locating features 290 along circumferential end faces 221, 223 as shown in FIG. 8. Each blade track segment 222 includes a pair of flanges 244, 246 extending from an outer surface 225 along axially-forward and axially-aft faces 241, 243 of the blade track segments 222. The circumferential end faces 221, 223 extend between the axial faces 241, 243 and are formed to include the non-planar locating feature 290.

The non-planar locating feature 290 has an angular profile as shown in FIG. 8. The angular profile of the non-planar locating feature 290 on end face 221 is substantially a mirror image of the angular profile of the non-planar locating feature 290 on end face 223. As such, end face 221 of one blade track segment 222 can engage with end face 223 of an adjacent blade track segment 222 along a substantially entire length of the end faces 221, 223 between the axial faces 241, 243.

The non-planar locating features 190, 290 axially align adjacent blade track segments 122, 222. Non-planar locating features having curved or angular profiles may also be added to radially align adjacent blade track segments. Other shapes and configurations for the non-planar locating features are possible.

Figure 9:
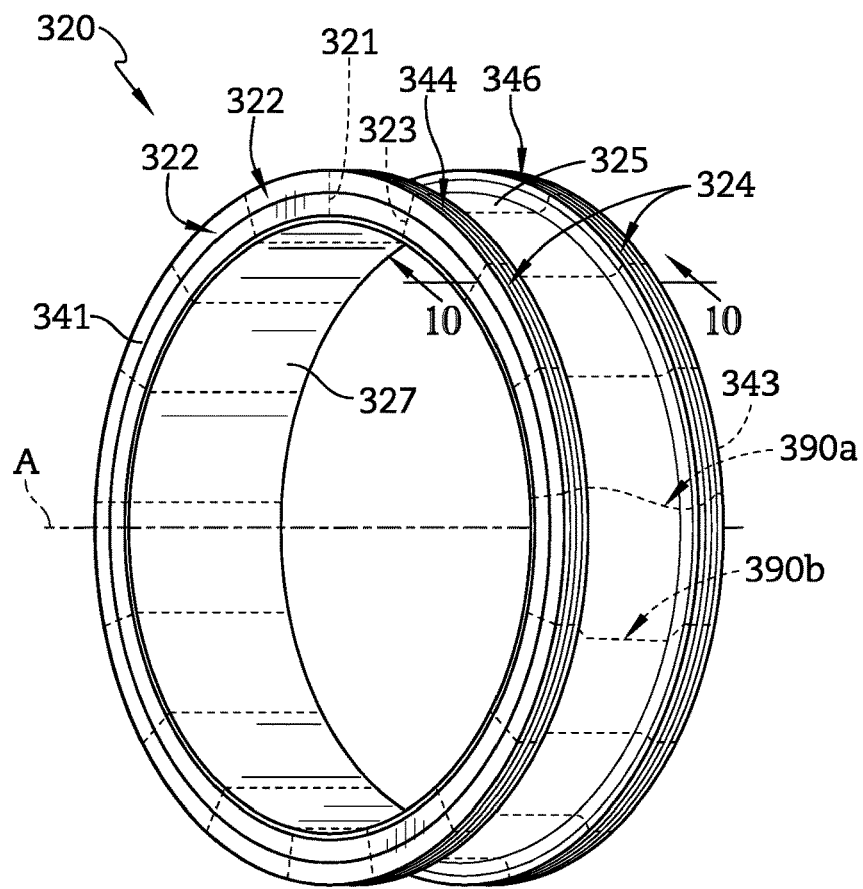
FIG. 9 is a perspective view of a blade track adapted for use in a turbine of the gas turbine engine to block hot gasses from passing over blades of a turbine wheel showing that the blade track includes a plurality of blade track segments arranged circumferentially adjacent to one another and a fiber wrap extending around the segments to provide a composite-lock structure that holds the blade track segments in a ring.
Figure 10:
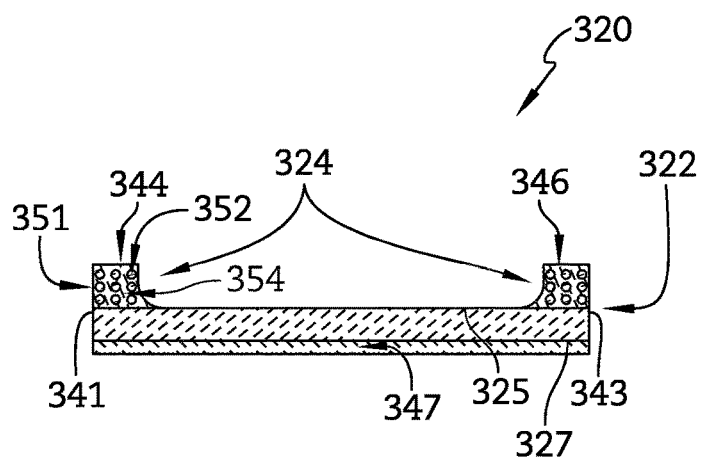
FIG. 10 is a sectional view of the blade track of FIG. 9 taken along line 10-10 showing that the composite-lock structure includes a pair of flanges extending radially outward from a central runner of the blade track segments along forward and aft faces of the blade track segments.

Another blade track 320 in accordance with the present disclosure is shown in FIGS. 9 and 10. The blade track 320 includes a plurality of blade track segments 322 that cooperate to form a ring and a composite-lock structure 324 integrated with the blade track segments 322. The blade track segments 322 are each shaped to extend part-way around a central axis A and comprise ceramic-matrix composite materials. The composite-lock structure 324 illustratively includes a pair of matrix-infiltrated fiber wraps 351 that extends around the blade track segments 322 and that is integrated with the blade track segments 322 to form full hoop blade track 320.

Each of the blade track segments 322 includes opposing circumferential end faces 321, 323 and a radially outer surface 325 extending between the end faces 321, 323 as shown in FIG. 9. The blade track segments 322 are positioned circumferentially around the central axis A to form a substantially continuous ring and the composite-lock structure 324 is positioned to engage the outer surfaces 325 of the blade track segments 322 to maintain the shape of the blade track 320. In some embodiments, the blade track segments 322 include non-planar locating features 390a along the end faces 321, 323. In other embodiments, the blade track segments 322 include non-planar locating features 390b along the end faces 321, 323. Each blade track segment 322 is illustratively made from silicon-carbide, silicon-carbide ceramic-matrix composite, but may be made from oxide, oxide ceramic-matrix composite or the like.

In the illustrative embodiment, the end faces 321, 323 extend radially inward from the outer surface 325 and are positioned to lie in a plane defined in part by the central axis A as suggested in FIG. 9. The composite-lock structure 24 is configured to provide a radially-inward force toward the central axis A against the blade track segments 322. The end faces 321, 323 of adjacent blade track segments 322 engage with one another to provide an opposing radially-outward force away from the central axis A and against the composite-lock structure 324. As such, each blade track segment 322 acts as a keystone to for circumferentially-adjacent blade track segments 322 maintain the form of the ring and blade track 320. The composite-lock structure 324 maintains alignment of the blade track segments 322 in the ring.

Radially-inward loads placed on the blade track 320 are distributed through the blade track segments 322 as compressive hoop load as suggested in FIG. 9. Radially-outward loads placed on the blade track 320 are distributed through the composite-lock structure 324 as tensile hoop load. In some embodiments, engagement between the end faces 321, 323 forms a seal between adjacent blade track segments 322. In some embodiments, the blade track segments 322 are integrally joined through co-processing, welding, or brazing, for example, to form a seal between adjacent blade track segments 322.

The matrix-infiltrated fiber wraps 351 form a pair of flanges 344, 346 that extend from the blade track segments 322 as shown in FIG. 9. The flanges 344, 346 extend radially outward from an outer surface 325 of the blade track segments 322 as shown in FIGS. 9 and 10. The forward flange 344 defines an axially-forward face 341 of the blade track segments 322 and the aft flange 346 defines an axially-aft face 343 of the blade track segments 322. The flanges 344, 346 are spaced apart from one another.

An abradable layer 347 may be applied to a radially-inward face 327 of the blade track segments 322 as shown in FIG. 8. In some embodiments, the blade track segments 322 may have an environmental barrier coating (EBC) or abradable coating applied to the radially-inward face 327 prior to or after assembly of the blade track 320.

The flanges 344, 346 are illustratively shown extending circumferentially along forward and aft edges of the blade track segments 322 in FIGS. 9 and 10. However, the flanges 344, 346 may be axially spaced from the forward and aft edges of the blade track segments 322 with portions of the outer surface 325 positioned between the flanges 344, 346 and the forward and aft edges. In some embodiments, seal members may be positioned on the portions of the outer surface 325 between the flanges 344, 346 and the forward and aft edges.

In the illustrative embodiment, the composite-lock structure 324 includes one or more reinforcement fibers 352 positioned within a lock body 354 as shown in FIGS. 9 and 10. The reinforcement fibers 352 comprise ceramic-containing materials and the lock body 354 comprises ceramic-matrix materials. In the illustrative embodiments, the reinforcement fibers 352 and the lock body 354 form a silicon-carbide, silicon-carbide ceramic-matrix composite, but may form an oxide, oxide ceramic-matrix composite or the like. In some embodiments, the reinforcement fibers 352 for each flange 344, 346 comprise a single, continuous fiber 352 that is wrapped along the outer surfaces 325 of the blade track segments 322 and around the ring of blade track segments 322 at least once. In other embodiments, the reinforcement fibers 352 are arranged in a fiber mat. In some embodiments, the fiber mat has a length allowing the fiber mat to be wrapped along the outer surfaces 325 of the blade track segments 322 and around the ring of blade track segments 322 at least once. Other arrangements for the reinforcement fibers 352 are possible.

The blade track 320 may have non-planar axial or radial locating features between the blade track segments 322. Alternatively, the blade track segments 322 may be assembled together in a partially processed state, such as after chemical vapor infiltration (CVI), and receive final processing together, such as through a slurry and/or melt infiltration. As such, the blade track segments 322 would be integrally joined, not allowing relative movement during operation of the engine.

Figure 11:
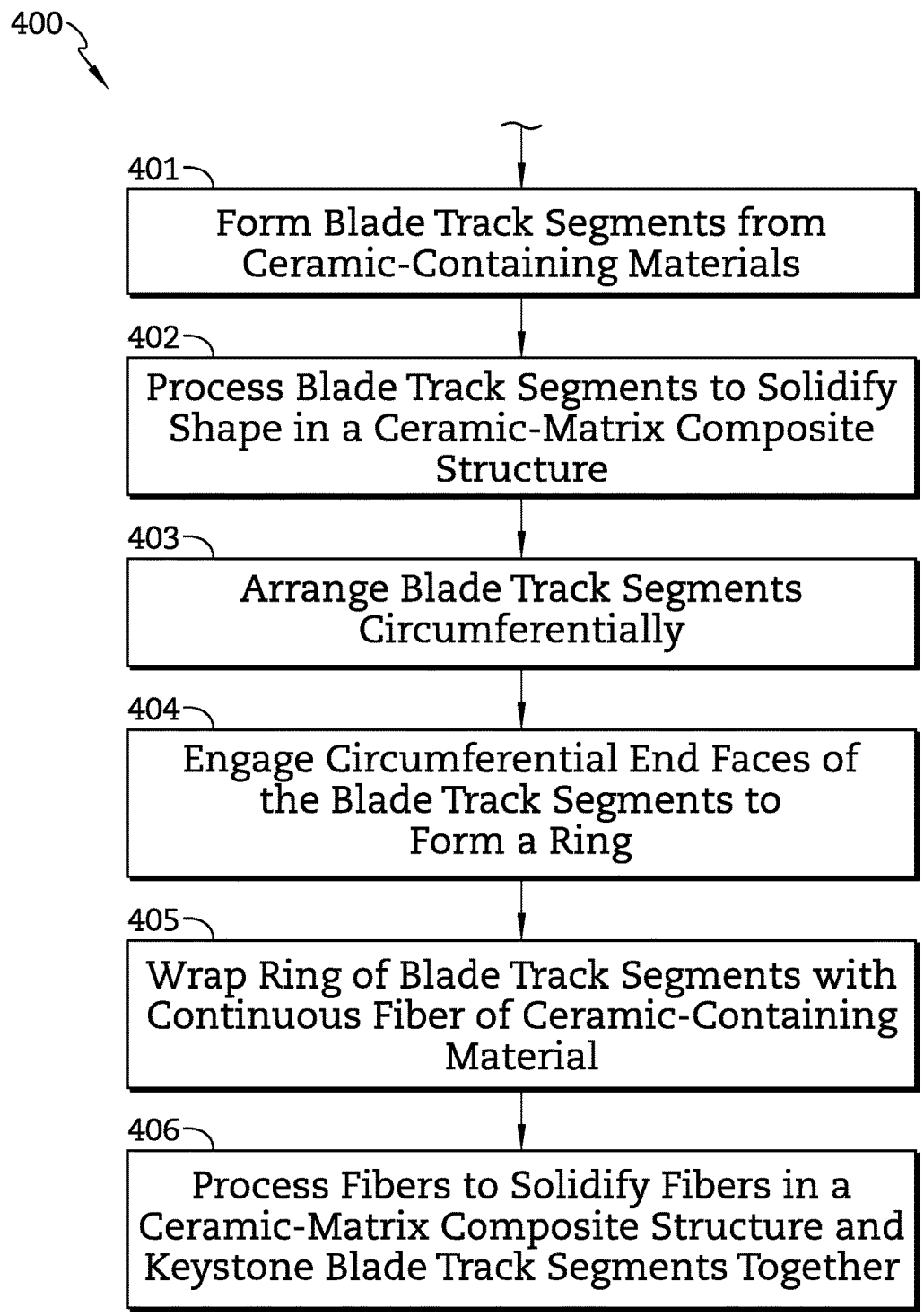
FIG. 11 is a diagrammatic view of an illustrative process for manufacturing a blade track.

In one illustrative embodiment, a process 400 is used to manufacture the blade track 20 or blade track 320 as shown in FIG. 11. The process begins at 401 where blade track segments are formed from ceramic-containing materials. In some embodiments, forming each blade track segment includes positioning one or more fiber-woven sheets of ceramic-containing material into a mold cavity to define the shape of the blade track segment. The blade track segments are processed to solidify their shape in a ceramic-matrix composite structure as indicated at 402. In some embodiments, processing the blade track segments includes injecting a ceramic-matrix material into the mold cavity and hardening the ceramic-matrix material.

The processed blade track segments are arranged circumferentially around a central axis as indicated at 403 in FIG. 11. In some embodiments, arranging the blade track segments includes positioning a circumferential end face of one blade track segment in confronting relation to a circumferential end face of another blade track segment. In some embodiments, arranging the blade track segments further includes axially aligning the flanges of the blade track segments and radially aligning the inner surfaces of the blade track segments. Circumferential end faces of adjacent blade track segments are engaged with one another to form a substantially continuous ring of blade track segments as indicated at 404.

The ring of blade track segments is wrapped with a continuous fiber of ceramic-containing material as indicated at 405 in FIG. 11. In some embodiments, wrapping the fiber includes positioning the fiber along radially-outer surfaces of the blade track segments. In some embodiments, the fiber is wrapped around the ring of blade track segments at least once. In some embodiments, the fiber is wrapped around the ring of blade track segments several times. In other embodiments, a fiber mat comprising ceramic-containing materials is used in place of the single continuous fiber.

The ring, including the fibers and ceramic-matrix material, are processed to solidify the fibers in a ceramic-matrix composite structure and keystone the blade track segments together as indicated at 406 in FIG. 11. During processing, the wrapped fiber is infiltrated with a ceramic-matrix material. In some embodiments, a slurry infiltration process is used. In other embodiments, a melt infiltration process is used. In some embodiments, the fiber is suspended in the ceramic-matrix material and does not contact the radially outer surfaces of the blade track segments after processing. In some embodiments, the fiber engages with the radially outer surfaces of the blade track segments after processing. In some embodiments, a portion of the fiber is suspended in the ceramic-matrix material while another portion of the fiber engages with the radially outer surfaces of the blade track segments after processing.

During manufacture via the method 400, the segments may undergo CVI processing. The segments may then be assembled together into a full hoop. By butting the segments up against each other, they form a complete hoop in which none of the segments can move radially inward due to the neighboring segments. Inward load is carried as compressive hoop load.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade track for a gas turbine engine, the blade track comprising
  a plurality of blade track segments comprising ceramic-matrix composite materials and shaped to extend partway around a central axis, each blade track segment including opposing circumferential end faces and a radially outer surface extending between the end faces, and
  an annular composite-lock structure positioned to engage the radially outer surfaces of the blade track segments, the composite-lock structure including ceramic-matrix materials and at least one reinforcement fiber of ceramic-containing material suspended in the ceramic-matrix materials of the annular composite-lock structure,
  wherein the blade track segments are positioned circumferentially around the central axis to form a ring, the end faces of the blade track segments are engaged with one another, and the composite-lock structure continuously extends circumferentially around the entire ring to provide a radially-inward force toward the central axis against each of the plurality of blade track segments such that each blade track segment acts as a keystone to maintain a form of the ring.

2. The blade track of claim 1, wherein the at least one reinforcement fiber is positioned to circumferentially surround the ring along the radially outer surfaces of the blade track segments.

3. The blade track of claim 2, wherein the at least one reinforcement fiber is a single continuous fiber that extends around the ring at least twice.

4. The blade track of claim 2, wherein the at least one reinforcement fiber includes a plurality of fibers.

5. The blade track of claim 2, wherein each of the blade track segments further includes a runner and a pair of flanges that extend radially outward from the outer surface of the runner to form a radially-outward opening lock-receiving channel with the runner that receives at least a portion of the composite-lock structure.

6. The blade track of claim 5, wherein a first one of the pair of flanges extends outwardly in a radial direction along an axially-forward face of the runner to form a generally continuous axially-forward face of the blade track segment.

7. The blade track of claim 6, wherein a second one of the pair of flanges extends outwardly in the radial direction along an axially-aft face of the runner to form a generally continuous axially-aft face of the blade track segment.

8. The blade track of claim 1, wherein the end faces of the blade track segments are configured to engage and form a resultant radially-outward force away from the central axis against the composite-lock structure.

9. The blade track of claim 8, wherein the end faces extend radially inward from the outer surface and are positioned to lie in a plane defined in part by the central axis.

10. A method of assembling a blade track for use in a gas turbine engine, the method comprising
positioning a plurality of blade track segments circumferentially around a central axis, each blade track segment comprising ceramic-matrix composite materials and shaped to extend part-way around the central axis, each blade track segment including opposing circumferential end faces and a radially outer surface extending between the end faces,
engaging the end faces of adjacent blade track segments together to form a ring of blade track segments, and
forming an annular composite-lock structure along the radially outer surfaces of the blade track segments, the composite-lock structure comprising ceramic-matrix composite materials,
wherein the composite-lock structure continuously extends circumferentially around the ring of blade track segments to provide a radially inward force against the blade track segments such that each blade track segment acts as a keystone to maintain a form of the ring of blade track segments.

11. The method of claim 10, wherein forming the composite-lock structure includes positioning at least one reinforcement fiber of ceramic-containing material along the outer surfaces of the blade track segments and suspending the at least one reinforcement fiber in ceramic-matrix materials included in the composite lock structure.

12. The method of claim 11, wherein suspending the at least one reinforcement fiber in ceramic-matrix material includes infiltrating the at least one reinforcement fiber with the ceramic-matrix material and solidifying the ceramic-matrix material to form a ceramic-matrix composite structure.

13. The method of claim 12, wherein the at least one reinforcement fiber is infiltrated using at least one of a slurry infiltration process or melt infiltration process.

14. The method of claim 11, wherein the at least one reinforcement fiber is a single continuous fiber.

15. The method of claim 14, further comprising wrapping the fiber around the ring along the radially outer surfaces of the blade tracks at least once.

16. The method of claim 14, further comprising wrapping the fiber around the ring along the radially outer surfaces of the blade tracks at least twice.

17. A method of forming a blade track for use in a gas turbine engine, the method comprising
forming a plurality of blade track segments from ceramic-matrix composite materials,
arranging the blade track segments in a ring, and
forming an annular composite-lock structure from ceramic-matrix composite materials along radially outer surfaces of the blade track segments,
wherein composite-lock structure continuously extends circumferentially around the entire ring and is configured to provide a radially inward force against the blade track segments such that each blade track segment acts as a keystone to maintain a form of the ring.

18. The method of claim 17, wherein forming the composite-lock structure includes wrapping a single continuous fiber of ceramic-containing material along the radially outer surfaces of the blade track segments at least once and suspending the at least reinforcement one fiber in ceramic-matrix material.

19. The method of claim 18, wherein suspending the at least one reinforcement fiber in ceramic-matrix material includes infiltrating the at least one reinforcement fiber with the ceramic-matrix material and solidifying the ceramic-matrix material to form a ceramic-matrix composite structure.

20. The method of claim 18, further comprising wrapping the fiber around the ring along the radially outer surfaces of the blade tracks at least twice.

* * * * *